Patented Aug. 11, 1925.

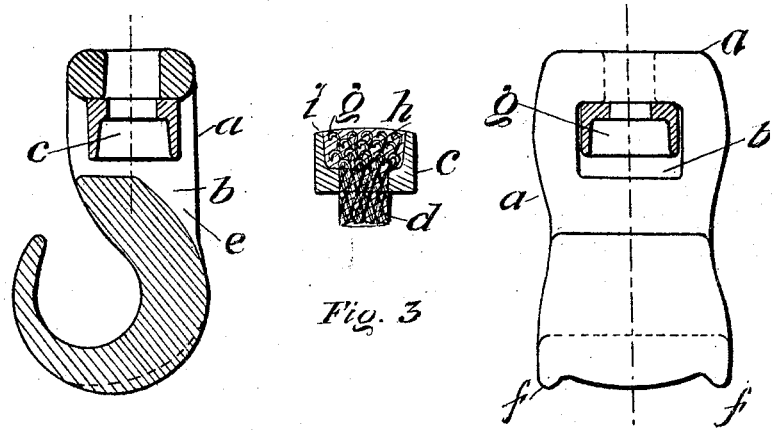
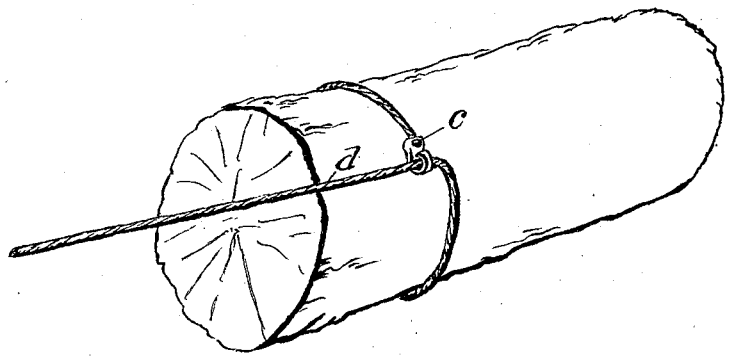

1,549,093

UNITED STATES PATENT OFFICE.

PATRICK L. LACHAPELLE, OF RED GAP, BRITISH COLUMBIA, CANADA.

CHOKER HOOK FOR LOGGING OPERATIONS.

Application filed February 16, 1922. Serial No. 536,924.

*To all whom it may concern:*

Be it known that I, PATRICK L. LACHAPELLE, a citizen of the United States of America, and a resident of Red Gap, in the district of Nanoose, Vancouver Island, in the Province of British Columbia, Canada, having invented certain new and useful Improvements in Choker Hooks for Logging Operations, do hereby declare that the following is a full, clear, and exact specification.

My invention relates to improvements in choker hooks such as are used in connection with logging operations, in which a steel cable terminating in a hook is passed round a log so as to encircle the same and thence engages the hook, thus forming an adjustable grip or cinch on the log which tightens with the strain, hence the hook is known by loggers as a "choker" hook.

These appliances as hitherto known and used frequently consist of a hook with some form of shackle pin arrangement for making connection to or with the steel cable, and are in fact necessarily clumsy, bulky and generally unhandy, costly to make and heavy and large to handle, they are therefore quite a drag on the efficiency of logging work.

In my invention these drawbacks are entirely gotten rid of by the adoption of a simple device in the nature of a swivel connection between the cable and the hook.

In the drawings:

Fig. I, shows a horizontal section through my improved choker hook. Fig. 2, shows an outside view of same in a plane at right angles to that of Fig. I, and Fig. 3, is a view showing the details of the steel terminal piece on the end of the cable and the method of attaching same. Fig. 4, shows an ordinary method of employing the choker hook.

It will be observed that my hook is of special form in several aspects the general shape being such as to provide for the peculiar strains and usage specially called for in choker hooks: the shank $a$, is enlarged in both directions in order to provide suitably for the recess $b$, which houses the cupped terminal $c$, into which the end of the cable $d$, in secured, this recess $b$, is so shaped and rounded at $e$, as to provide access to the keying of the cable, and also to avoid friction at any sharp edge: this avoidance of corners is a feature throughout and it will be observed that the hook is of such exterior form as to readily roll or slide into the naturally best position to take the strain, one exception to this function however is to be observed at the rounded projections $f$, which with the adjoining grooves are thus shaped so as to slightly dig into the surface of the log under operation, and thus provide thereat the necessary amount of friction.

In Fig. 3, the end of the steel cable $d$, threaded into the cupped recess $g$, of the terminal $c$, the separated ends of the cable $d$, are made hook-shape as shown at $h$, and molten Babbitt metal is run in around and amongst them, and floated over at $i$, thus effectively keying the steel cable to the terminal $c$.

What I claim as my invention, and desire to secure by Letters Patent, is:

In a choker hook for logging the combination comprising, an enlarged shank of rounded rectangular outlines, said shank being pierced centrally and axially from the outer end by a circular hole which opens into a rectangular hole at right angles to it, said rectangular hole or slot cutting entirely through the said shank and having expanded and rounded orifices, a thimble secured on a cable threaded through said circular hole and located within said rectangular hole or slot, all substantially as described and shown.

Red Gap, 23rd December, 1921.

PATRICK L. LACHAPELLE.

Signed in the presence of

Capt. V. A. JACOBSON,

C. A. RODWAY.